(12) United States Patent
Kanazawa

(10) Patent No.: US 11,681,908 B2
(45) Date of Patent: Jun. 20, 2023

(54) QUANTUM STATE CLASSIFIER USING RESERVOIR COMPUTING

(71) Applicant: INTERNATIONAL BUSINESS MACHINES CORPORATION, Armonk, NY (US)

(72) Inventor: Naoki Kanazawa, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 909 days.

(21) Appl. No.: 16/570,592

(22) Filed: Sep. 13, 2019

(65) Prior Publication Data

US 2021/0081779 A1 Mar. 18, 2021

(51) Int. Cl.
*G06N 3/08* (2023.01)
*G06N 10/00* (2022.01)
(Continued)

(52) U.S. Cl.
CPC .............. *G06N 3/08* (2013.01); *G06N 3/044* (2023.01); *G06N 3/065* (2023.01); *G06N 10/00* (2019.01)

(58) Field of Classification Search
CPC .......... G06N 10/00; G06N 10/40; G06N 3/08; G06N 3/0445; G06N 3/063; G06N 3/0635

See application file for complete search history.

(56) References Cited

U.S. PATENT DOCUMENTS

| | | |
|---|---|---|
| 10,211,856 B1 * | 2/2019 | Petre .................. H04B 1/001 |
| 2016/0156357 A1 | 6/2016 | Miller et al. |

(Continued)

FOREIGN PATENT DOCUMENTS

| | | |
|---|---|---|
| WO | WO2004086513 A1 | 10/2004 |
| WO | WO2018219839 A1 | 12/2018 |

OTHER PUBLICATIONS

Fujii et al., "Harnessing Disordered-Ensemble Quantum Dynamics for Machine Learning", 2017, Physical Review Applied, pp. 1-20 (Year: 2017).*

(Continued)

*Primary Examiner* — Paulinho E Smith
(74) *Attorney, Agent, or Firm* — Tutunjian & Bitetto, P.C.; Erik Johnson

(57) ABSTRACT

A quantum state classifier includes a reservoir computing circuit for post-processing a quantum bit to obtain a readout signal, and a readout circuit, coupled to the reservoir computing circuit, for discriminating a quantum state of the quantum bit from the readout signal from among multiple possible quantum states. The readout circuit is trained in a calibration process respectively activated by a specific one of each of the multiple quantum states such that weights within the linear readout circuit are updated by minibatch learning for each of multiple measurement sequences of the calibration process. The readout circuit generates a binary output after the multiple measurement sequences in a post-calibration classification process for a test quantum bit. The quantum state classifier further includes a controller, coupled to the readout circuit, selectively triggerable to output a control pulse responsive to the quantum state of the test quantum bit indicated by the binary output.

23 Claims, 6 Drawing Sheets

(51) Int. Cl.
  *G06N 3/044* (2023.01)
  *G06N 3/065* (2023.01)

(56) References Cited

U.S. PATENT DOCUMENTS

2017/0357561 A1* 12/2017 Kelly ................... G06F 11/00
2018/0003753 A1   1/2018 Bishop et al.

OTHER PUBLICATIONS

Fujii et al., "Harnessing Disordered Quantum Dynamics for Machine Learning", Feb. 26, 2016, Physical Review Applied, pp. 1-19 (Year: 2016).*

Heroux et al., "Delayed Feedback Reservoir Computing with VCSEL", 2018, pp. 594-602. (Year: 2018).*

Tanaka et al., "Recent Advances in Physical Reservoir Computing: A Review", 2019, Neural Networks, pp. 100-123. (Year: 2019).*

Paiva et al., "Quantum-Inspired Optimization of Echo State Networks Applied to System Identifiication", 2018, pp. 1-8. (Year: 2018).*

Krantz et al., "A Quantum Engineer's Guide to Superconducting Qubits", Jun. 2019, pp. 1-57. (Year: 2019).*

Bronn et al., "Fast, high-fidelity readout of multiple qubits", 12th International Workshop on Low Temperature Electronics, ___ 2017, pp. 1-11.

Magesan et al., "Machine Learning for Discriminating Quantum Measurement Trajectories and Improving Readout", Physical Review Letters, American Physical Society, May 2015, pp. 1-5.

Ghosh et al., "Quantum reservoir computing", arXiv: 1811.10335v1, Nov. 2018, pp. 1-8.

Lukosevicius et al., "Reservoir computing approaches to recurrent neural network training", Elsevier, Computer Science Review (2009), Mar. 2009, 23 pages.

Keisuke Fujii et al., "Harnessing Disordered Ensemble Quantum Dynamics for Machine Learning", arXiv:1602.08159v2 [quant-ph], Nov. 9, 2016, pp. 1-19.

Jean Benoit Heroux, "Delayed Feedback Reservoir Computing with VCSEL", Springer Nature Switzeriand AG, Nov. 2018, pp. 594-602.

Philip Krantz et al, "A Quantum Engineer's Guide to Superconducting Qubits", arXiv:1904.06560v3 [quant-ph], Aug. 9, 2019, pp. 1-66.

Gouhei Tanaka, "Recent Advances in Physical Reservoir Computing: A review", Elsevier Ltd., Mar. 2019, pp. 100-123.

International Search Report for international application PCT/EP2020/073499 dated Nov. 13, 2020, 4 pages.

* cited by examiner

QUANTUM STATE CLASSIFIER USING RESERVOIR COMPUTING

BACKGROUND

The present invention generally relates to quantum computing, and more particularly to a quantum state classifier using reservoir computing. Deploying machine learning algorithms requires expensive digital electronics (e.g., FPGA) and tuning of hyper parameters for each qubit, which is impracticable for large-scale quantum computers. Moreover, short-time measurement requires fast Analog-to-Digital Converters (ADCs), which are power consuming and cannot be integrated into cryogenic electronics due to cooling power limitations. Hence, there is a need for a quantum state classifier capable of overcoming the aforementioned limitations.

SUMMARY

According to an aspect of the present invention, a quantum state classifier is provided. The quantum state classifier includes a reservoir computing circuit for post-processing a quantum bit to obtain a readout signal. The quantum state classifier further includes a linear readout circuit, operatively coupled to the reservoir computing circuit, for discriminating a quantum state of the quantum bit from the readout signal from among multiple possible quantum states. The linear readout circuit is trained in a calibration process respectively activated by a specific one of each of the multiple quantum states such that weights within the linear readout circuit are updated by minibatch learning for each of multiple measurement sequences of the calibration process. The linear readout circuit generates a binary output after the multiple measurement sequences in a post-calibration classification process for a test quantum bit. The quantum state classifier further includes a controller, operatively coupled to the linear readout circuit, selectively triggerable to output a control pulse responsive to the quantum state of the test quantum bit indicated by the binary output.

According to another aspect of the present invention, a method is provided for quantum state classification. The method includes post-processing, by a reservoir computing circuit, a quantum bit to obtain a readout signal. The method further includes discriminating, by a linear readout circuit operatively coupled to the reservoir computing circuit, a quantum state of the quantum bit from the readout signal from among multiple possible quantum states while training the linear readout circuit in a calibration process respectively activated by a specific one of each of the multiple quantum states. The training process updates weights within the linear readout circuit by minibatch learning for each of multiple measurement sequences of the calibration process. The method also includes generating, by the linear readout circuit, a binary output after the multiple measurement sequences in a post-calibration classification process for a test quantum bit. The method additionally includes selectively triggering a controller operatively coupled to the linear readout circuit to output a control pulse responsive to the quantum state of the test quantum bit indicated by the binary output.

According to yet another aspect of the present invention, a quantum state classifier is provided. The quantum state classifier includes an analog reservoir computing circuit for post-processing a quantum bit using an Echo State Network (ESN), at least one delayed feedback device and a non-linear amplifier to obtain a readout signal. The quantum state classifier further includes a linear readout circuit, operatively coupled to the reservoir computing circuit, for discriminating a quantum state of the quantum bit from the readout signal from among multiple possible quantum states. The linear readout circuit is trained in a calibration process respectively activated by a specific one of each of the multiple quantum states such that weights within the linear readout circuit are updated by minibatch learning for each of multiple measurement sequences of the calibration process. The linear readout circuit generates a binary output after the multiple measurement sequences in a post-calibration classification process for a test quantum bit. The quantum state classifier further includes a controller, operatively coupled to the linear readout circuit, selectively triggerable to output a control pulse responsive to the quantum state of the test quantum bit indicated by the binary output.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to a quantum state classifier using reservoir computing.

In an embodiment, a readout signal from a quantum bit is post-processed by a reservoir computing circuit. In an embodiment, the reservoir computing circuit is followed by linear readout circuit for discriminating quantum state. In an embodiment, these circuits can be implemented by analog hardware such one or respective microwave circuits for each of the reservoir computing circuit and the linear readout circuit.

In an embodiment, the linear readout circuit is trained to be activated by a specific quantum state. Output weights within the linear readout circuit are updated by minibatch learning for each measurement sequence. This process corresponds to calibration.

In an embodiment, the linear readout circuit generates a binary output after a measurement sequence so that a controller can be triggered by the quantum state. This process corresponds to classification.

Figure 1:
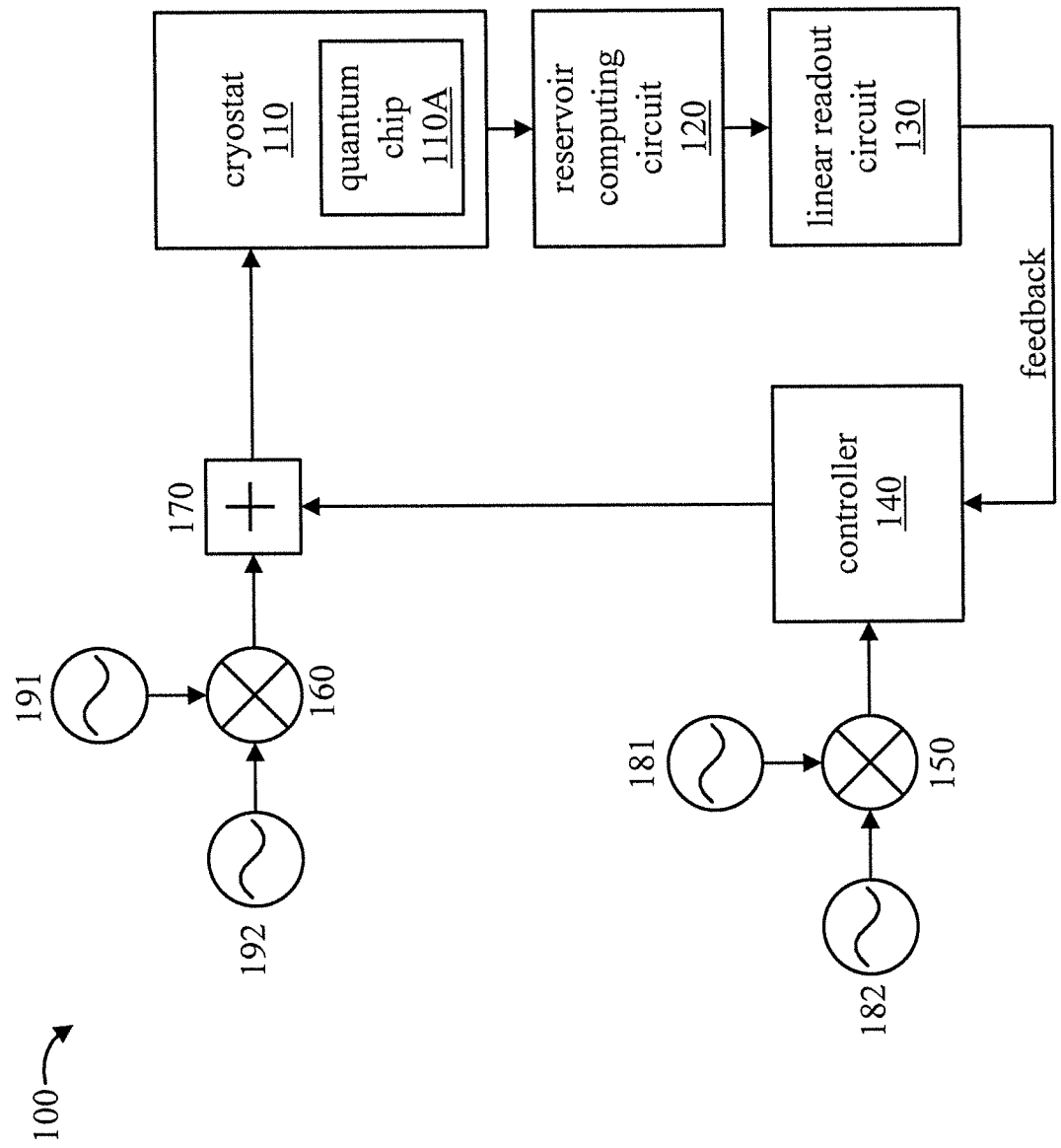
FIG. 1 is a block diagram showing an exemplary quantum state classifier, in accordance with an embodiment of the present invention.

FIG. 1 is a block diagram showing an exemplary quantum state classifier 100, in accordance with an embodiment of the present invention.

The quantum state classifier 100 includes a cryostat 110, a reservoir computing circuit 120, a linear readout circuit 130, a quantum controller 140, an IQ mixer 150, an IQ mixer 160, and a combiner 170. The cryostat 110 includes a quantum chip 110A for processing quantum information.

The IQ mixer 150 receives a gate pulse 181 and a Local Oscillator (LO) output 182. The IQ mixer 160 receives a measurement tone 191 and a LO output 192.

In an embodiment, a readout signal from a quantum bit is post-processed by the reservoir computing circuit 120. Such post-processing can involve, for example, filtering, delaying, amplification. The linear readout circuit 130 discriminates the quantum state of the quantum bit. These circuits 120 and 130 can be implemented by analog hardware. In an embodiment, the analog hardware includes a microwave circuit. For a physical implementation, the microwave circuit can include nonlinear and delayed feedback components. Additionally, the microwave circuit can include other physical components having fast dynamics such as, for example, but not limited to, an optical system. Also, the microwave circuit can be implemented in whole or in part by one or more Field Programmable Gate Arrays (FPGAs) and/or one or more Application Specific Integrated Circuits (ASICs). For a method-based implementation, an Echo State Network (ESN) or its' derivatives (e.g., a Leaky Fire ESN), liquid state machines or similar techniques can be used to classify time domain signals. In an embodiment, the reservoir computing circuit 120 includes a set of recurrently connected units. Thus, in an embodiment, the reservoir computing circuit 120 is implemented by an Echo State Network (ESN) (see FIG. 6). The behavior of the ESN is non-linear, and the only weights that are modified during training are for the synapses that connect the hidden neurons to output neurons.

The linear readout circuit 130 is trained to be activated by a specific quantum state. Output weights within the linear readout circuit 130 are updated by minibatch learning for each of multiple measurement sequences. This process corresponds to a calibration process.

The linear readout circuit 130 generates a binary output after the measurement sequences so that the controller 140 can be triggered by the quantum state. This process corresponds to a post-calibration (classification) process.

Thus, the dynamics of the reservoir computing circuit 120 map the input to a higher dimension. Then, the linear readout circuit 130 is trained to read the state of the reservoir and map the state to the desired output. The main benefit is that training is performed only at the readout stage and the reservoir 120 is fixed.

It is to be appreciated that while the reservoir computing circuit 120 is described herein relative to an ESN in one or more embodiments, in other embodiments, other types of reservoir computing circuits can be used including, for example, but not limited to, a context reverberation network, a backpropagation-decorrelation network, a liquid state machine, and so forth.

Figure 2:
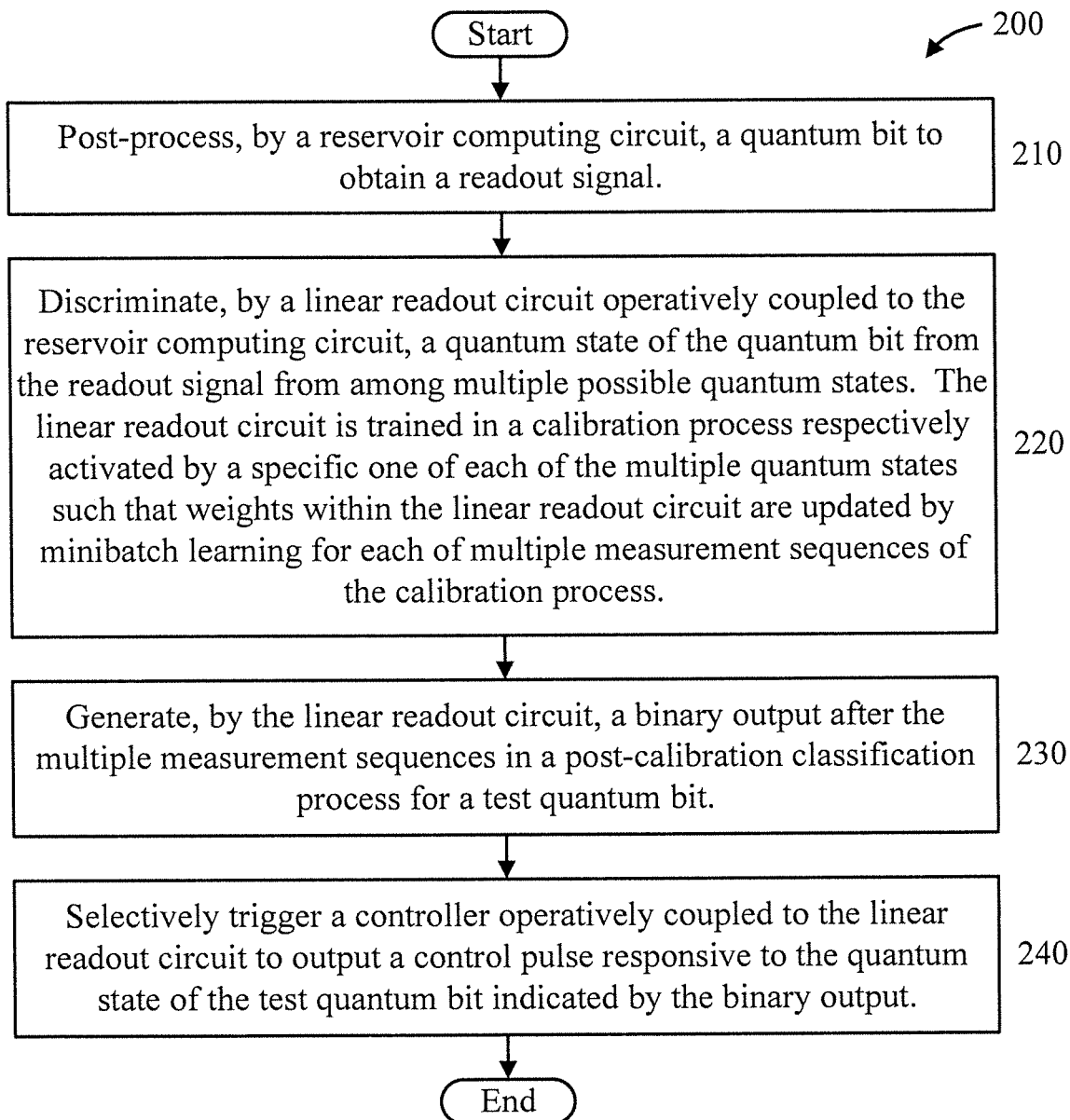
FIG. 2 is a flow diagram showing an exemplary method for a quantum classification, in accordance with an embodiment of the present invention.

FIG. 2 is a flow diagram showing an exemplary method 200 for a quantum classification, in accordance with an embodiment of the present invention.

At block 210, post-process, by a reservoir computing circuit, a quantum bit to obtain a readout signal.

At block 220, discriminate, by a linear readout circuit operatively coupled to the reservoir computing circuit, a quantum state of the quantum bit from the readout signal from among multiple possible quantum states. The linear readout circuit is trained in a calibration process respectively activated by a specific one of each of the multiple quantum states such that weights within the linear readout circuit are updated by minibatch learning for each of multiple measurement sequences of the calibration process.

At block 230, generate, by the linear readout circuit, a binary output after the multiple measurement sequences in a post-calibration classification process for a test quantum bit.

At block 240, selectively trigger a controller operatively coupled to the linear readout circuit to output a control pulse responsive to the quantum state of the test quantum bit indicated by the binary output.

Figure 3:
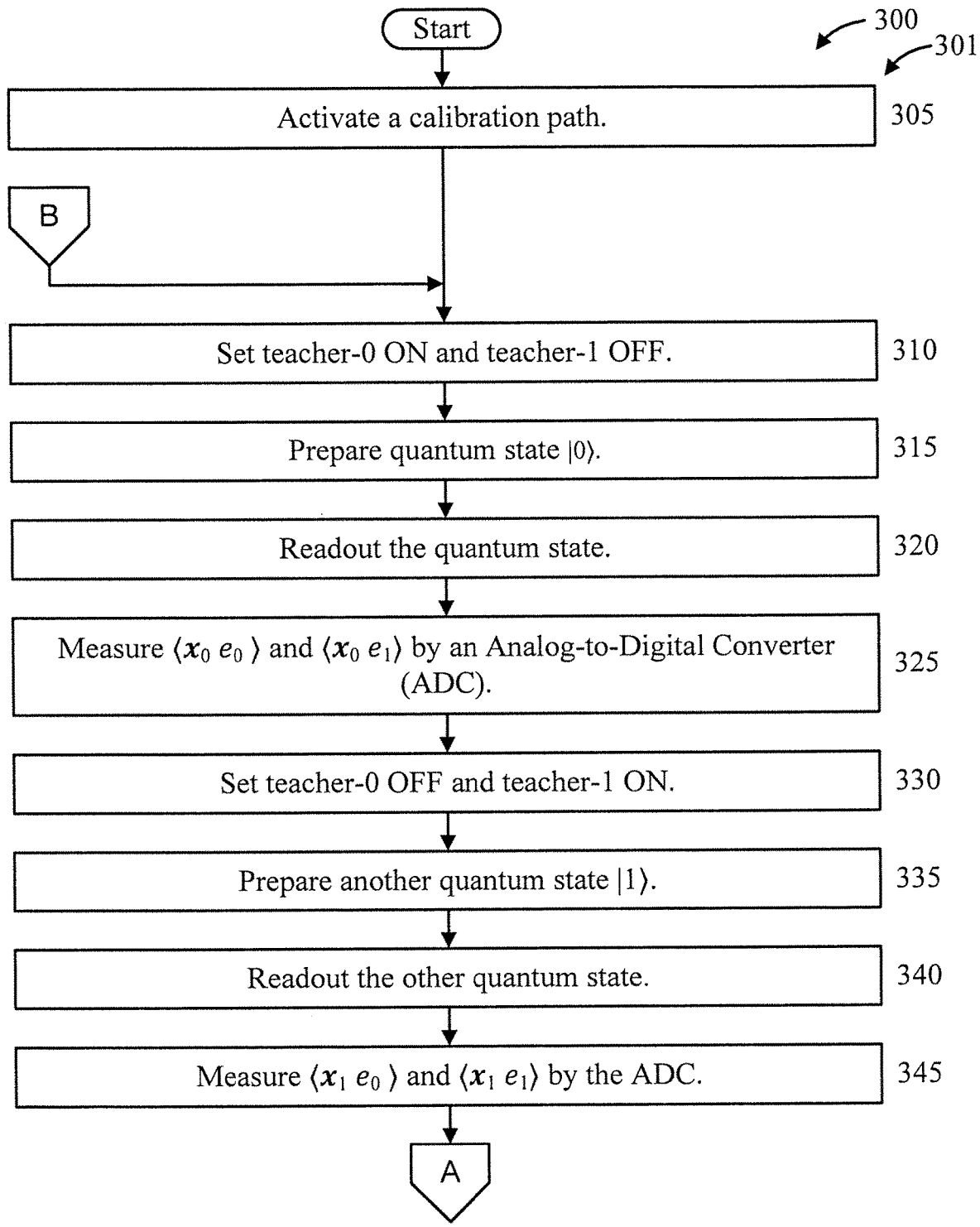
FIGS. 3-4 are flow diagrams showing an exemplary method for training and using a quantum classifier, in accordance with an embodiment of the present invention.
Figure 4:
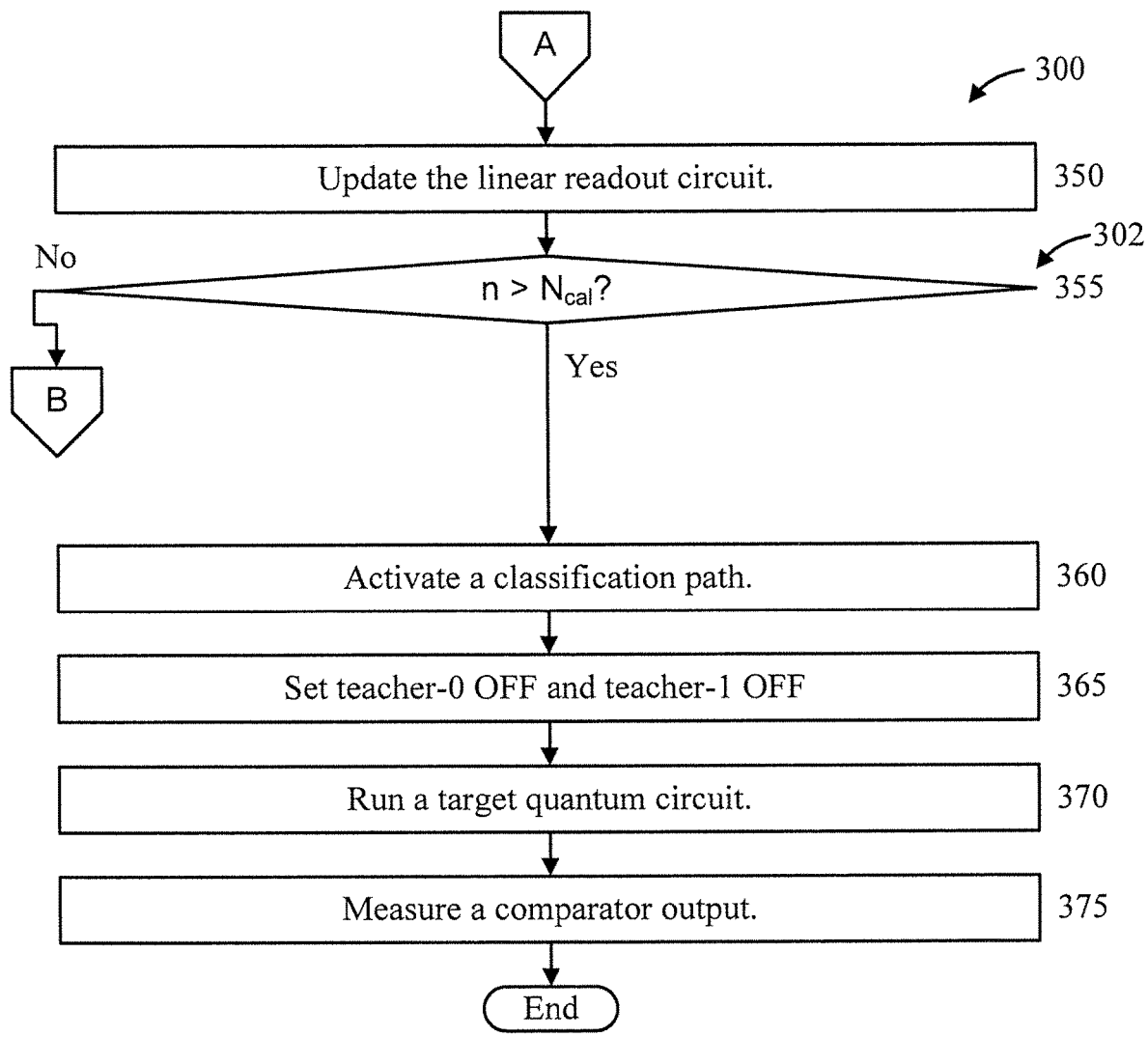

FIGS. 3-4 are flow diagrams showing an exemplary method 300 for training and using a quantum classifier, in accordance with an embodiment of the present invention. The method 300 includes a calibration portion 301 and a classification portion 302. The calibration portion 301 includes blocks 305 through 350. The classification portion 302 includes blocks 355 through 380.

At block 305, activate a calibration path.

At block 310, set teacher-0 ON and teacher-1 OFF. This block corresponds to enabling calibration relative to the quantum state prepared by block 315.

At block 315, prepare a quantum state $|0\rangle$.

At block 320, readout the quantum state.

At block 325, measure $\langle x_0 e_0 \rangle$ and $\langle x_0 e_1 \rangle$ by an Analog-to-Digital Converter (ADC).

At block 330, set teacher-0 OFF and teacher-1 ON. This block corresponds to enabling calibration relative to the quantum state prepared by block 335.

At block 335, prepare another quantum state $|1\rangle$.

At block 340, readout the other quantum state.

At block 345, measure $\langle x_1 e_0 \rangle$ and $\langle x_1 e_1 \rangle$ by the ADC.

At block 350, update the linear readout circuit.

At block 355, determine whether n>NCAL. If so, then proceed to block 360. Otherwise, return to block 310. In block 355, n is a variable denoting a current iteration number, and NCAL is a threshold number of iterations. Hence, once the threshold has been exceeded, the calibration portion 301 is terminated, and the classification portion 302 can be commenced.

At block 360, activate a classification path.

At block 365, set teacher-0 OFF and teacher-1 OFF. This block corresponds to enabling quantum state classification.

At block 370, run a target quantum circuit. This block corresponds to inputting a test quantum bit whose quantum state is to be discriminated.

At block 375, measure a comparator output. The comparator output includes a binary value indicative of the quantum state of the test quantum bit. The value of the quantum state can be used to cause an action to be performed in a computer processing system or another system coupled to or receiving an output from a quantum classifier in accordance with an embodiment of the present invention.

Figure 5:
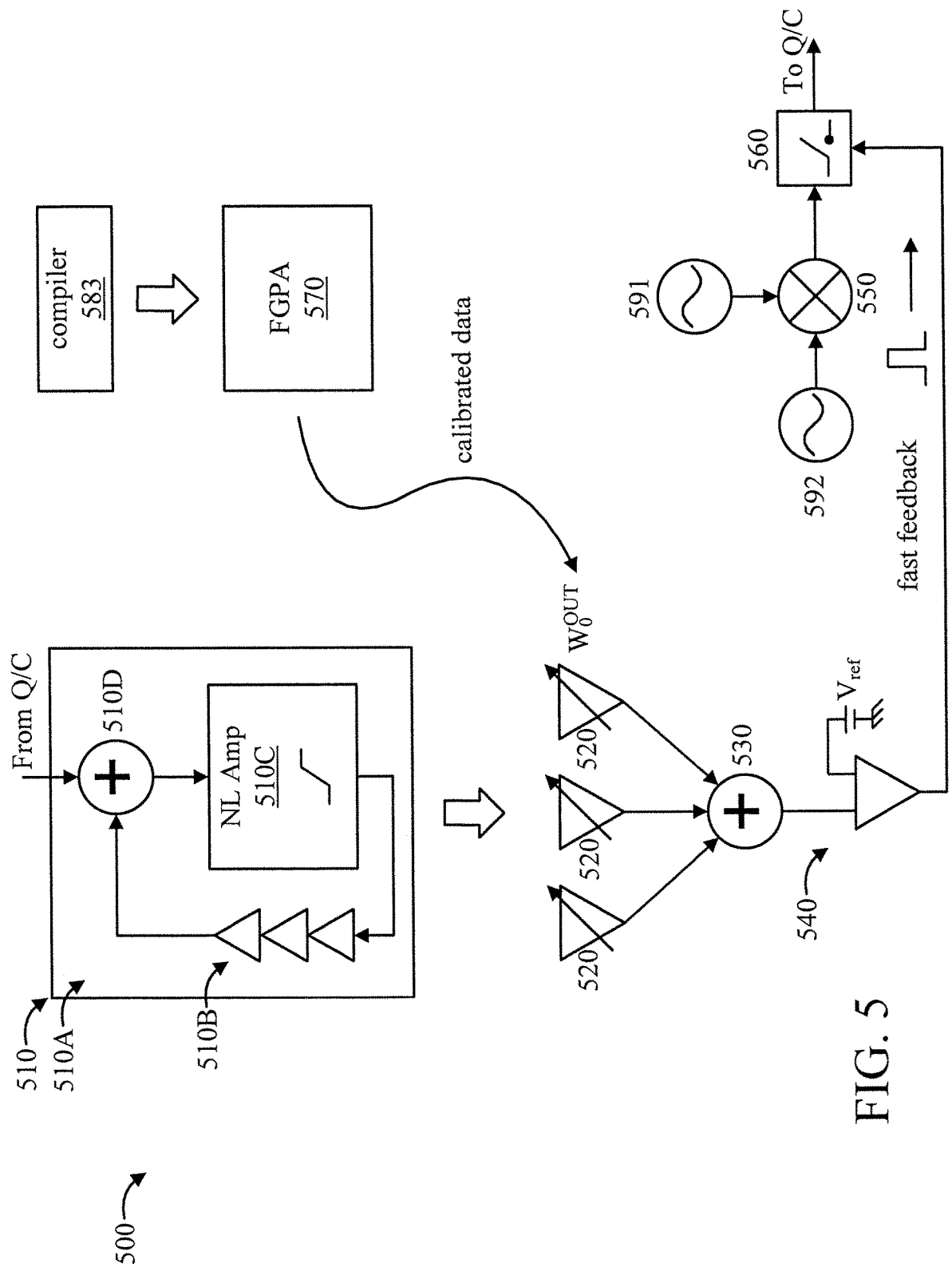
FIG. 5 is a block diagram showing another exemplary quantum state classifier, in accordance with an embodiment of the present invention.

FIG. 5 is a block diagram showing another exemplary quantum state classifier 500, in accordance with an embodiment of the present invention.

The following variable definitions and abbreviations apply:

NL Amp Non-Linear Amplifier
$W_0^{OUT}$ Gain of Readout Amplifier
LO Local Oscillator
I-Q mixer In-phase Quadrature mixer
Q/C Quantum Chip
$V_{ref}$ reference voltage for comparator The quantum state classifier 500 includes a physical reservoir 510, a set of readout amplifiers 520, an adder 530, a quantum state '1' detector 540, an I-Q mixer 550, a Microwave switch 560, and a Field Programmable Gate Array (FPGA) 570. The IQ mixer 550 receives a gate pulse 591 and a Local Oscillator (LO) output 592.

The physical reservoir 510, corresponding to and implementing the reservoir computing circuit 520, includes an analog circuit 510A with delayed feedback (implemented by buffers) 510B, a Non-Linear (NL) amplifier 510C, and a combiner 510D.

Each output weight $W_0$ can be expressed by a gain of the readout amplifiers 520, as determined from the application of calibrated data from the FGPA 570 which, in turn, is obtained from a compiler 583.

A comparator (e.g., OP-amp) 540A of the detector 540 is used to binarize a pre-processed signal by the physical reservoir 510.

The configuring of the output weights of readout amplifiers 520 switches the target quantum state to be detected. Thus, detector 540 can generate a trigger for arbitrary quantum states. The weight information is stored and properly configured against given conditional pulses.

A conditional pulse is controlled by the fast microwave switch 560 with a gate signal 581 from comparator 540A.

Figure 6:
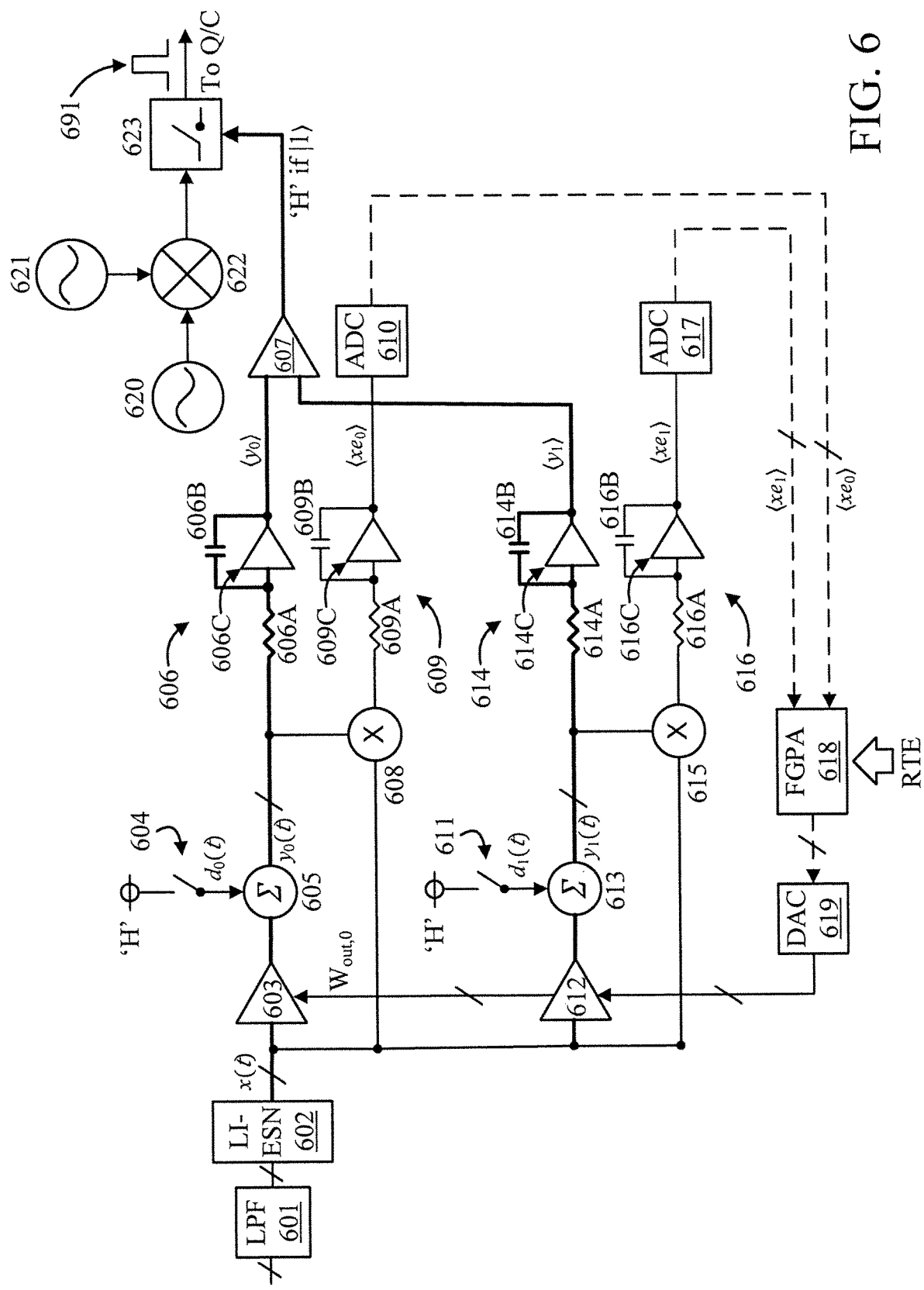
FIG. 6 is a block diagram showing yet another exemplary quantum state classifier, in accordance with an embodiment of the present invention.

FIG. 6 is a block diagram showing yet another exemplary quantum state classifier 600, in accordance with an embodiment of the present invention.

The following variable definitions and abbreviations apply:

|0⟩ a quantum state
|1⟩ another quantum state
x(t) signal from reservoir unit 602
$W_{out,0}$ output weight corresponding to |0⟩ quantum state
$y_0(t)$ activation of output neuron to detect |0⟩ quantum state
'H' high voltage state of digital circuit
$d_0(t)$ reference signal for |0⟩ quantum state
⟨$y_0$⟩ mean activation of output neuron to detect |0⟩ quantum state
⟨$xe_0$⟩ output weight update for |0⟩ quantum state
MW Microwave
LO Local Oscillator
LPF Low Pass Filter
LI-ESN Leaky Integrator Echo State Network
$W_{out,1}$ output weight corresponding to |1⟩ quantum state
$y_1(t)$ activation of output neuron to detect |1⟩ quantum state
$d_1(t)$ reference signal for |0⟩ quantum state
⟨$y_1$⟩ mean activation of output neuron to detect |1⟩ quantum state
⟨$xe_1$⟩ output weight update for |1⟩ quantum state
Q/C Quantum Controller
IQ mixer In-phase Quadrature mixer
ADC Analog-to-Digital Converter
DAC Digital-to-Analog Converter
RTC Room Temperature Electronics (e.g., personal computer)

The quantum state classifier 600 includes a LPF 601, a LI-ESN (e.g., a microwave circuit) 602, a readout amplifier 603, a switch 604, a summer 605, an analog integrator sub-circuit 606 (formed of resistor 606A, capacitor 606B, and amplifier 606C), an op-amp based comparator (hereinafter "comparator") 607, a mixer 608, an analog integrator sub-circuit 609 (formed of resistor 609A, capacitor 609B, and amplifier 609C), an ADC 610, a switch 611, a readout amplifier 612, a summer 613, an analog integrator sub-circuit 614 (formed of resistor 614A, capacitor 614B, and amplifier 614C), a mixer 615, an analog integrator sub-circuit 616 (formed of resistor 616A, capacitor 616B, and amplifier 616C), an ADC 617, a Field Programmable Gate Array (FPGA) 618, a DAC 619, an I-Q mixer 622, and a Microwave (MW) switch 623. The IQ mixer 622 receives a gate pulse 621 and a Local Oscillator (LO) output 620.

The switch 604 controls the input of 'H' to the summer 605 responsive to the quantum state |0⟩. The switch 611 controls the input of 'H' to the summer 605 responsive to the quantum state |1⟩.

In an embodiment, the reservoir computing circuit 120 can be considered to include the following: LPF 601; and LI-ESN 602.

In an embodiment, the linear readout circuit 130 can be considered to include the following: readout amplifier 603; switch 604; summer 605; analog integrator sub-circuit 606, comparator 607; mixer 608; analog integrator sub-circuit 609; ADC 610; switch 611; readout amplifier 612; summer 613; analog integrator sub-circuit 614; mixer 615; analog integrator sub-circuit 616; ADC 617; Field Programmable Gate Array (FPGA) 618; and DAC 619.

In an embodiment, the reservoir computing circuit 120 includes an analog circuit with delayed feedback and a non-linear amplifier.

Each output weight $W_{out}$ can be expressed by a gain of a readout amplifier.

The output signal is integrated by an analog integrator (sub-circuit) to output the mean activation of each neuron, which avoids the requirement of a fast ADC.

The linear readout circuit 130 has different paths for quantum state classification and calibration. In an embodiment, the calibration path can output a cost function of an adaptive filter. A classification path 692 is shown using thicker lines versus the non-classification (i.e., calibration path). Dotted lines indicate a digital communication path. The adaptive filter is implemented by FPGA 618.

In an embodiment, comparator 607 is used to binarize a pre-processed signal by the reservoir computing circuit 120.

A conditional pulse 691 is controlled by fast microwave switch 623 triggered by the signal from comparator 607.

In an embodiment, the reservoir computing circuit 120 can be installed at the 50K or 4K flange of the cryostat 110 because power consuming elements (ADC/DAC) are not necessary.

It is to be appreciated that the present invention be applied to any type of quantum state.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A quantum state classifier, comprising:
a reservoir computing circuit for post-processing a quantum bit to obtain a readout signal;
a linear readout circuit, operatively coupled to the reservoir computing circuit, for discriminating a quantum state of the quantum bit from the readout signal from among multiple possible quantum states, the linear readout circuit being trained in a calibration process respectively activated by a specific one of each of the multiple quantum states such that weights within the linear readout circuit are updated by minibatch learning for each of multiple measurement sequences of the calibration process, wherein the linear readout circuit generates a binary output after the multiple measurement sequences in a post-calibration classification process for a test quantum bit; and
a controller, operatively coupled to the linear readout circuit, selectively triggerable to output a control pulse responsive to the quantum state of the test quantum bit indicated by the binary output,
wherein the linear readout circuit comprises an analog integrator circuit for outputting a mean activation of each of a plurality of neurons.

2. The quantum state classifier of claim 1, wherein the reservoir computing circuit and the linear readout circuit comprise at least one analog hardware circuit.

3. The quantum state classifier of claim 2, wherein the at least one hardware circuit comprises at least one microwave circuit.

4. The quantum state classifier of claim 1, wherein the reservoir computing circuit comprises a non-linear amplifier using delayed feedback to amplify the readout signal.

5. The quantum state classifier of claim 1, wherein each of the weights is determined as a function of a gain of at least one readout amplifier comprised in the linear readout circuit.

6. The quantum state classifier of claim 1, wherein the linear readout circuit comprises at least some different circuit paths for the calibration process versus the post-calibration classification process.

7. The quantum state classifier of claim 6, wherein a corresponding one of the different circuit paths for the calibration process outputs a cost function of an adaptive filter.

8. The quantum state classifier of claim 1, wherein the reservoir computing circuit comprises a comparator for binarizing a pre-processed signal representative of the quantum bit prior to the post-processing.

9. The quantum state classifier of claim 8, further comprising a microwave switch triggerable by an output of the comparator.

10. The quantum state classifier of claim 1, wherein the linear readout circuit is comprised in a cryostat.

11. The quantum state classifier of claim 10, wherein the reservoir computing circuit is comprised in the cryostat.

12. The quantum state classifier of claim 1, wherein the linear readout circuit is tuned by adjustment of the weights.

13. The quantum state classifier of claim 1, wherein the reservoir computing circuit comprises a Leaky Integrator Echo State Network (LI-ESN).

14. The quantum state classifier of claim 1, wherein each of the multiple measurement sequences correspond to a respective one of the multiple possible quantum states.

15. A method for quantum state classification, comprising:
post-processing, by a reservoir computing circuit, a quantum bit to obtain a readout signal;
discriminating, by a linear readout circuit operatively coupled to the reservoir computing circuit, a quantum state of the quantum bit from the readout signal from among multiple possible quantum states while training the linear readout circuit in a calibration process respectively activated by a specific one of each of the multiple quantum states, wherein the training process updates weights within the linear readout circuit by minibatch learning for each of multiple measurement sequences of the calibration process;
generating, by the linear readout circuit, a binary output after the multiple measurement sequences in a post-calibration classification process for a test quantum bit; and
selectively triggering a controller operatively coupled to the linear readout circuit to output a control pulse responsive to the quantum state of the test quantum bit indicated by the binary output,
wherein the linear readout circuit comprises an analog integrator circuit for outputting a mean activation of each of a plurality of neurons.

16. The method for quantum state classification of claim 15, wherein the calibration process sequentially updates the weights for each of the multiple possible quantum states.

17. The method for quantum state classification of claim 15, wherein the calibration process comprises switching between calibration modes for each of the multiple possible quantum states.

18. The method for quantum state classification of claim 15, further comprising determining each of the weights as a function of a gain of at least one readout amplifier comprised in the linear readout circuit.

19. The method for quantum state classification of claim 15, further comprising tuning the linear readout circuit by adjustment of the weights.

20. The method for quantum state classification of claim 15, wherein said post-processing step comprises binarizing, by a comparator, a pre-processed signal representative of the quantum bit prior to the post-processing.

21. A quantum state classifier, comprising:
an analog reservoir computing circuit for post-processing a quantum bit using an Echo State Network (ESN), at least one delayed feedback device and a non-linear amplifier to obtain a readout signal;
a linear readout circuit, operatively coupled to the reservoir computing circuit, for discriminating a quantum state of the quantum bit from the readout signal from among multiple possible quantum states, the linear readout circuit being trained in a calibration process respectively activated by a specific one of each of the multiple quantum states such that weights within the linear readout circuit are updated by minibatch learning for each of multiple measurement sequences of the calibration process, wherein the linear readout circuit generates a binary output after the multiple measurement sequences in a post-calibration classification process for a test quantum bit; and a controller, operatively coupled to the linear readout circuit, selectively triggerable to output a control pulse responsive to the quantum state of the test quantum bit indicated by the binary output, wherein the linear readout circuit comprises an analog integrator circuit for outputting a mean activation of each of a plurality of neurons.

22. The quantum state classifier of claim 21, wherein the linear readout circuit and the reservoir computing circuit are comprised in a cryostat.

23. The quantum state classifier of claim 21, wherein the Echo State Network is a Leaky Integrator Echo State Network (LI-ESN).

* * * * *